United States Patent [19]

Lambert

[11] Patent Number: 5,929,546

[45] Date of Patent: Jul. 27, 1999

[54] MAGNETIC BEARING FOR ACTIVE CENTERING OF A BODY MOBILE RELATIVE TO ANOTHER ABOUT AT LEAST ONE AXIS

[75] Inventor: Charles Lambert, Cannes la Bocca, France

[73] Assignee: Aerospatiale Societe Nationale Industrielle, Paris, France

[21] Appl. No.: 08/885,903

[22] Filed: Jun. 30, 1997

[30] Foreign Application Priority Data

Jul. 5, 1996 [FR] France ................................. 96 08414

[51] Int. Cl.⁶ .............................. H02K 1/06; F16C 39/06
[52] U.S. Cl. ........................................................ 310/90.5
[58] Field of Search ..................... 310/90.5, 12; 361/147

[56] References Cited

U.S. PATENT DOCUMENTS

| | | |
|---|---|---|
| 3,694,041 | 9/1972 | Studer ........................................ 308/10 |
| 4,634,191 | 1/1987 | Studer ...................................... 310/90.5 |
| 4,918,345 | 4/1990 | Vaillant De Guelis et al. ...... 310/90.5 |
| 5,625,240 | 4/1997 | Bernus ..................................... 310/90.5 |

FOREIGN PATENT DOCUMENTS 59-50220   3/1984   Japan ...................................... 310/90.5

*Primary Examiner*—Nestor Ramirez
*Assistant Examiner*—B Mullins
*Attorney, Agent, or Firm*—Evenson, McKeown, Edwards & Lenahan, PLLC

[57] ABSTRACT

A magnetic bearing for active centering about at least one centering axis of a second body mobile relative to a first body has a first portion including two parallel ferromagnetic plates, a first core carrying a first coil and permanently magnetized means magnetized perpendicularly to the ferromagnetic plates, said first mounted between said ferromagnetic plates. The bearing has a second portion separated from the ferromagnetic plates of the first portion by a pair of airgaps of variable thickness parallel to the centering axis. The permanently magnetized means are offset relative to the core in a direction substantially parallel to the pair of airgaps and the ferromagnetic plates are provided with notches facing the permanently magnetized means and oriented transversely to the pair of airgaps.

13 Claims, 3 Drawing Sheets

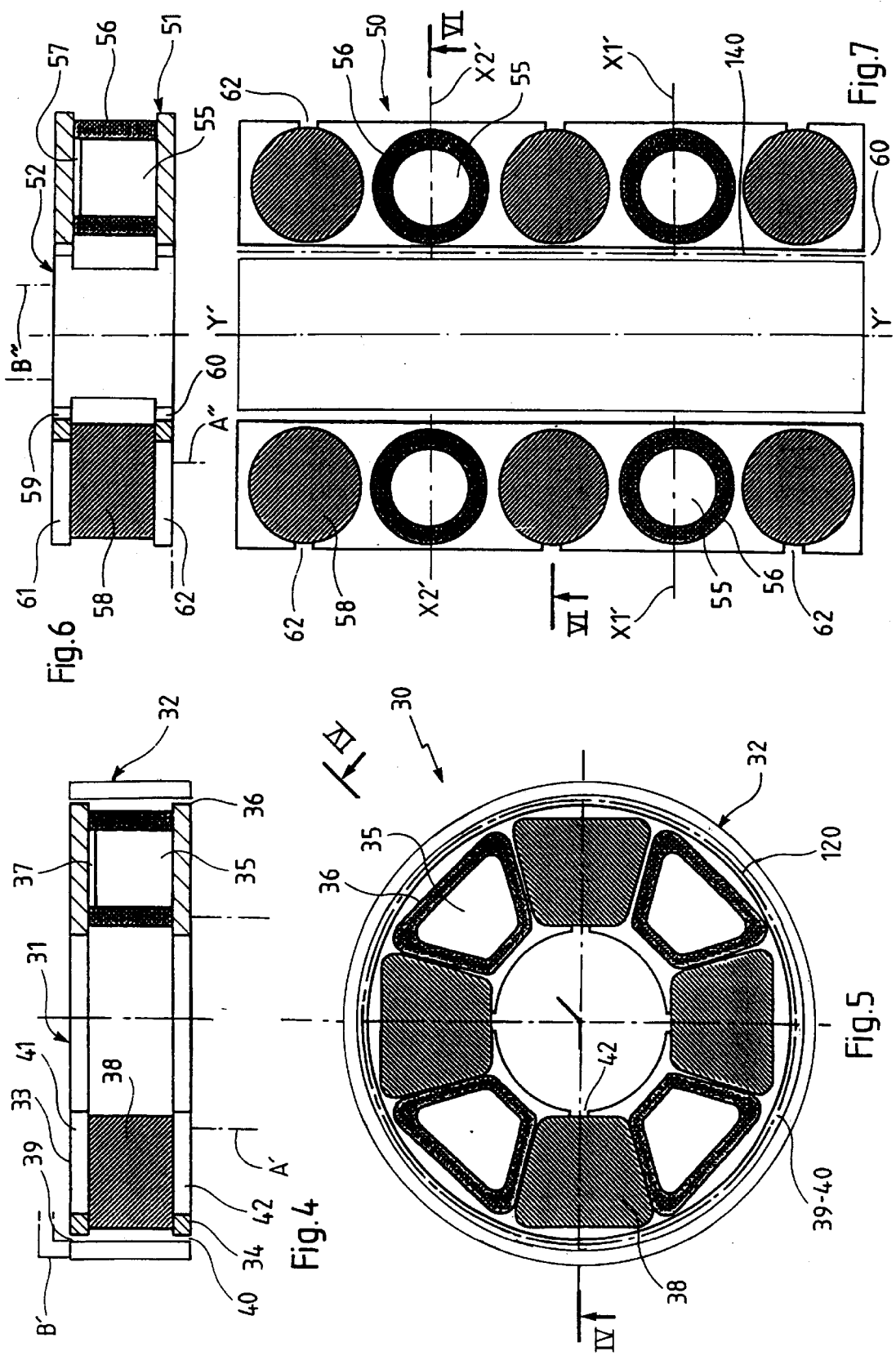

MAGNETIC BEARING FOR ACTIVE CENTERING OF A BODY MOBILE RELATIVE TO ANOTHER ABOUT AT LEAST ONE AXIS

BACKGROUND OF THE INVENTION

1. Field of the invention

The invention concerns a magnetic bearing for active centering of a second body mobile relative to a first body about at least one axis. The second body can be a body mobile in rotation relative to a stator or a body mobile in translation relative to a fixed body.

2. Description of the prior art

Various magnetic bearings for active centering of a body mobile relative to another body about at least one centering axis known in themselves include first and second portions adapted to be fixed to one or to the other of the bodies, separated by a pair of airgaps of variable thickness parallel to the centering axis. These airgaps extend along a line of relative movement between the portions, this line of relative movement being parallel to the ferromagnetic plates. In the case of a rotor mobile relative to a stator, this line of movement is typically annular; on the other hand, in the case of a body mobile in translation relative to a second body, this line of relative movement is substantially linear. The first portion (usually the portion which is fixed to that of the two bodies which is fixed, which explains why it is usually referred to as the stator portion) includes two parallel ferromagnetic plates between which are disposed a core carrying a coil and permanently magnetized means the magnetization direction of which is perpendicular to said plates. The second portion, typically carried by the mobile body, is made of a ferromagnetic material and closes the fluxes generated in the pair of airgaps by the coil and by the permanently magnetized means.

In a manner that is entirely conventional, the magnetic fluxes generated by the coil and by the permanently magnetized means circulate in substantially coplanar magnetic loops in a plane substantially perpendicular to the ferromagnetic plates and to the line of relative movement so that the fluxes combine simply by addition or subtraction. This is why the permanently magnetized means are typically disposed between the core and the coil, on the one hand, and the pair of airgaps, on the other hand.

A bearing design of the above kind has until now proved an entirely satisfactory response to many requirements. Nevertheless, it has the disadvantage of considerable overall size transversely to the airgaps; this constitutes a handicap to obtaining magnetic bearings of very small size. Moreover, the permanently magnetized means are generally in the form of a magnetized bar extending parallel to the line of relative movement, i.e. to the pair of airgaps. This magnetized bar is therefore annular in the case of a rotor mobile relative to a stator; alternatively, this bar is linear in the case of a body mobile in translation relative to a fixed body. In the situation of centering a rotor relative to a stator, the bearing design of the above type therefore requires the production of a magnetized ring having precise dimensions (in particular its diameter), which means that, to avoid the necessity to maintain a large stock of magnets, the annular magnetized bars have to be made as and when required, which increases the manufacturing times of magnetic bearings for rotor/ stator combinations and results in high costs.

With regard to the first disadvantage, concerning the overall size transversely to the airgaps, it has already been proposed to make the core and therefore the coil kidney-bean-shape along the magnetized bars. This enables some degree of minimization of the overall radial size of the bearings for rotors. Note, however, that the efficiency of any such coil is not optimal since the section of the core in which the coil generates a flux is necessarily small, unless a very long coil is acceptable with a large number of turns around the core.

Another disadvantage is that the magnetized bars are generally manufactured by sintering. It is well known that as the size and the volume of dense sintered parts increase it quickly becomes difficult to obtain parts of good quality at moderate cost. There is therefore at present a limitation on the size of bearings for rotors that can be made at acceptable cost.

An aim of the invention is to overcome the aforementioned disadvantages. It is therefore directed to enabling production of the magnets without any prior knowledge of the dimensions or even the design of the bearing for which they are intended. It is also directed to enabling the manufacture of large bearings, up to sizes exceeding those that can currently be made. Conversely, it is directed to enabling the manufacture of very small bearings, in particular with regard to the overall size transversely to the airgaps. Finally, it is aimed at improving the efficiency of the coils, i.e. to increasing the ratio between the section of each turn and its length (for the core this corresponds to the largest possible ratio between its section and its perimeter).

SUMMARY OF THE INVENTION

To this end the invention proposes a magnetic bearing for active centering about at least one centering axis of a second body mobile relative to a first body, including:

a first portion adapted to be fixed to one of the first and second bodies, including two parallel ferromagnetic plates, a first core carrying a first coil and permanently magnetized means magnetized perpendicularly to the ferromagnetic plates, the first portion and the permanently magnetized means being mounted between the ferromagnetic plates, and a second portion adapted to be fixed to the other of the first and second bodies and separated from the ferromagnetic plates of the first portion by a pair of airgaps of variable thickness parallel to the centering axis, the airgaps extending along a line of relative movement parallel to the ferromagnetic plates, wherein the permanently magnetized means are offset relative to the core in a direction substantially parallel to the pair of airgaps and the ferromagnetic plates are provided with notches facing the permanently magnetized means and oriented transversely to the pair of airgaps.

Because the permanently magnetized means and the cores carrying their coil are now offset parallel (rather than perpendicularly) to the line of relative movement along which the pair of airgaps extends, the overall size transversely to this pair of airgaps is minimized. This arrangement marks a complete break with the usual bearing design since the invention proposes that the flux lines generated by the permanently magnetized means and by the coil can cross the airgaps at different locations. Accordingly, the magnetic loops formed by these flux lines are no longer, even approximately, coplanar in a plane perpendicular to the ferromagnetic plates and substantially parallel to the centering axis. The notches in line with each of the permanently magnetized means (which in practise are magnets) nevertheless make it possible to delimit in the ferromagnetic plates areas delimiting in the latter the space available for the distribution of the flux lines for a given centering axis. The fact that the permanently magnetized means are offset relative to the core along the airgaps also has the corollary that these means can be magnets with a size or shape independent of the size of the final bearing.

The permanently magnetized means preferably include two permanent magnets on opposite sides of the core parallel to the pair of airgaps. This establishes a symmetry of the flux lines on both sides of the core (along the pair of airgaps) when the coil is not energized.

Said bearing preferably includes at least one second core carrying a second coil and second permanently magnetized means offset parallel to said pair of airgaps relative to said second core, said second core being mounted between said ferromagnetic plates and offset relative to said first core parallel to said pair of airgaps and separated from said first core by a permanent magnet forming part of both said first and said second permanently magnetized means. This second core, carrying a second coil, in practise defines the second centering axis, and the permanent magnet between the two coils can contribute to centering about each of its two axes by splitting its flux lines on opposite sides of the notches.

The bearing advantageously includes alternating permanent magnets and cores along the pair of airgaps. In this way there can be several centering axes.

In accordance with another preferred teaching of the invention, the magnets are contiguous with the core(s). This assures optimal occupation of the volume between the ferromagnetic plates and along the pair of airgaps.

To increase further the occupancy of this volume between the ferromagnetic plates, the magnets and the cores can have polygonal sections with sides either substantially parallel or substantially transverse to the pair of airgaps.

A bearing of this kind can be used to center a rotor relative to a stator. The pair of airgaps separating the first and second portions is then annular. This bearing preferably includes four cores carrying four coils and alternating with four permanent magnets. This defines two centering axes at 90° to each other, each centering axis being determined by the combination of two diametrally opposed coils.

Alternatively, the bearing can be used to center a body mobile in translation relative to a fixed body. It is in this configuration in particular that the shape and the dimensions of the magnets can be chosen independently of the dimensions of the bearing, in particular its length.

The centering axis is advantageously parallel to the ferromagnetic plates. This feature is known in itself. However, it must be understood that the centering axis can instead be perpendicular to these plates, for example for active axial centering of a rotor relative to a stator.

Objects, features and advantages of the invention will emerge from the following description given with reference to the accompanying drawings.

BRIEF DESCRIPTION OF THE DRAWINGS

FIG. 4 is a view in axial section of a second embodiment of a bearing in accordance with the invention.

FIG. 5 is a top view of the bearing from FIG. 4 after removal of a ferromagnetic plate.

FIG. 6 is a cross-sectional view of a bearing in accordance with the invention for centering a body mobile in translation relative to a fixed body.

FIG. 7 is a top view of the bearing from FIG. 6 after removal of a ferromagnetic plate from this bearing.

DETAILED DESCRIPTION OF THE PREFERRED EMBODIMENTS

Figure 1:
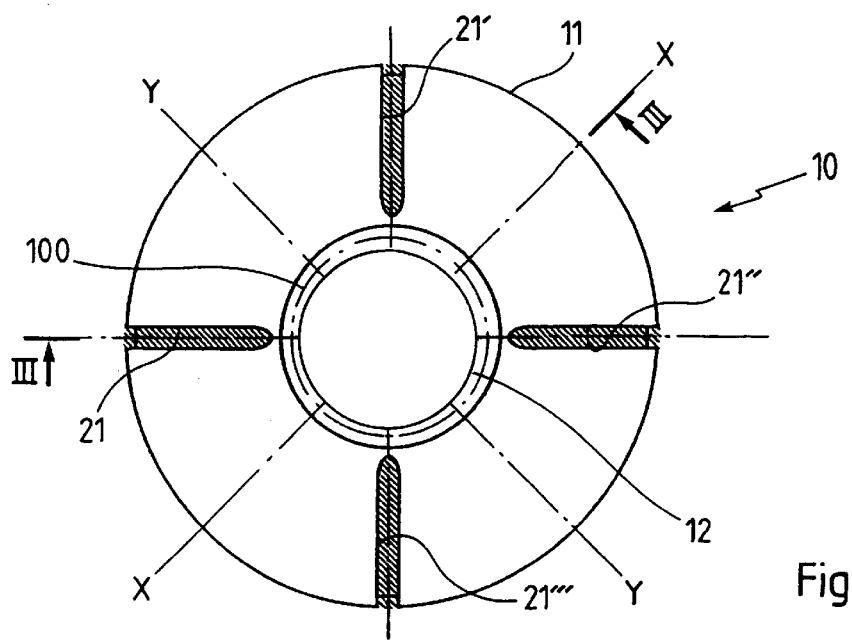
FIG. 1 is a top view of a bearing in accordance with the invention for centering a rotor relative to a stator.
Figure 2:
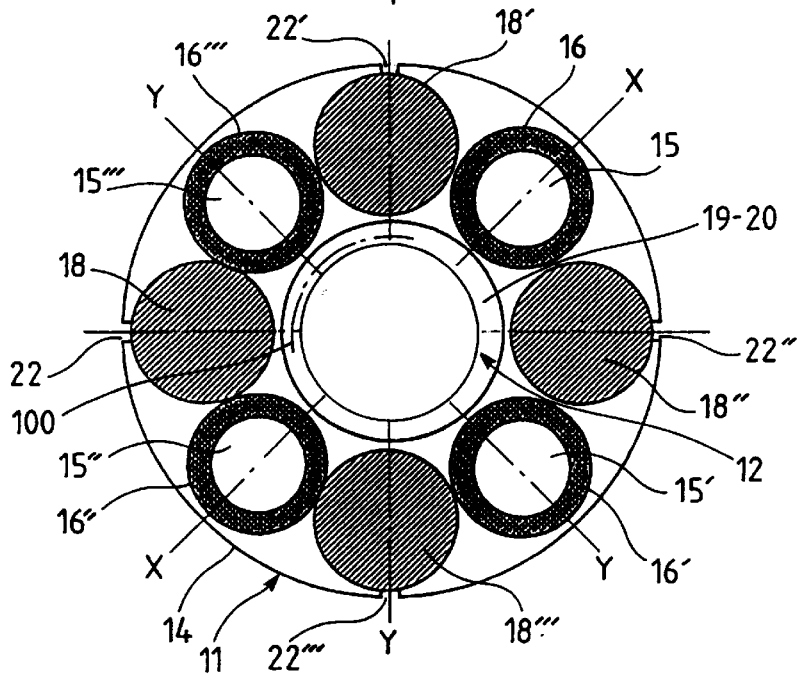
FIG. 2 is a top view of the bearing from FIG. 1 after removal of the ferromagnetic plate covering the magnets and the cores.
Figure 3:
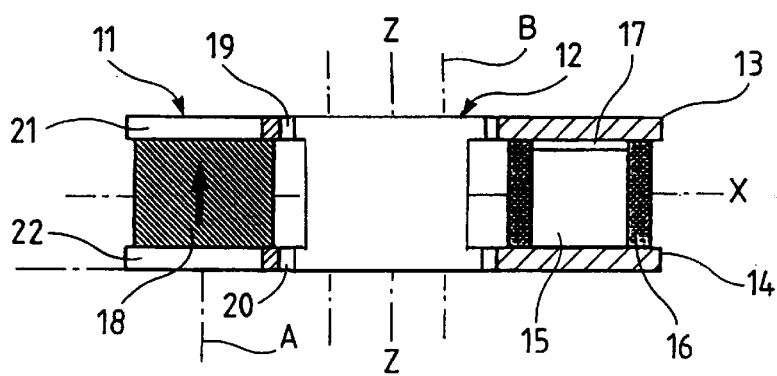
FIG. 3 is a view of the bearing from FIG. 1 in axial section taken along the line III—III in FIG. 1.

The bearing shown in FIGS. 1 to 3 is for radial centering of a mobile body B rotating about a rotation axis Z—Z relative to a fixed body A.

In a manner that is known in itself, this bearing 10 includes a first portion 11 adapted to be fixed to one body A and a second portion adapted to be fixed to the other body B (see FIG. 3).

The first portion includes two ferromagnetic plates 13 and 14 disposed perpendicularly to the rotation axis Z—Z. The righthand half of FIG. 3 shows that the bearing includes, between the two ferromagnetic plates 13 and 14, a first core 15 carrying a first coil 16 disposed on one of the centering axes, namely the axis X—X. In a manner that is known in itself, an amagnetic material part 17 constituting a static shim is disposed between the core 15 and one of the ferromagnetic plates.

The lefthand half of FIG. 3 shows that the bearing 10 also includes permanently magnetized means 18 between the two ferromagnetic plates 13 and 14, its magnetization direction being parallel to the rotation axis Z—Z.

The ferromagnetic plates 13 and 14 are separated from the second ferromagnetic portion 12 by a pair of airgaps 19 and 20 extending along a line 100 of relative movement (see FIG. 1), a circular line in this instance.

FIG. 2 shows that the bearing 10 includes two cores carrying two coils for each of the X—X and Y—Y centering axes. To be more precise, the bearing 10 includes four cores 15, 15', 15" and 15"' carrying coils 16, 16', 16" and 16"'.

In accordance with an essential feature of the invention, the permanently magnetized means disposed between the ferromagnetic plates 13 and 14 are offset relative to the core carrying the coils, parallel to the pair of airgaps. To be more precise, the cores and the magnets alternate, each magnet 18, 18', 18" and 18"' being disposed between two cores and vice versa. Moreover, each ferromagnetic plate 13 or 14 has notches 21, 21', 21", 21"' and 22, 22', 22", 22"' facing each of the magnets 18 through 18"' in the axial direction (i.e. in the direction parallel to the rotation axis Z—Z).

Figure 8:
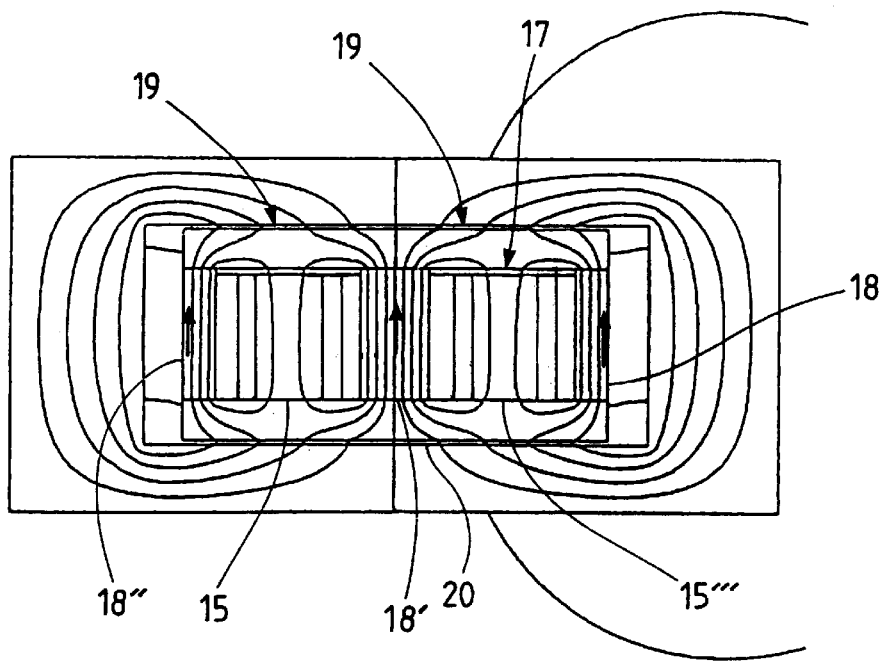
FIG. 8 is a diagram showing an approximation of the flux lines generated by the magnet in the pair of airgaps of a bearing in accordance with the invention.
Figure 9:
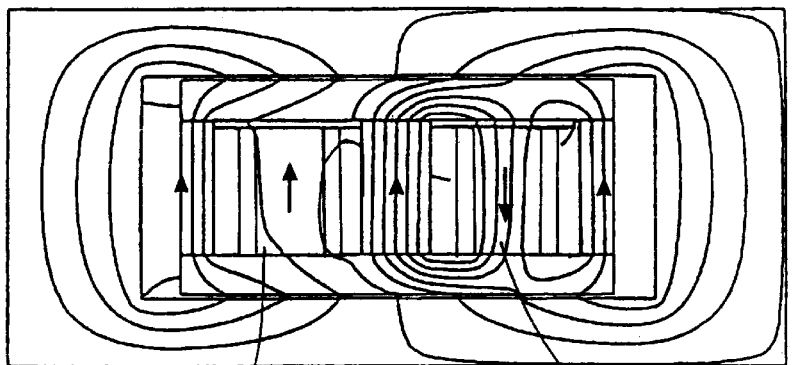
FIG. 9 is a diagram showing an approximation of the flux lines generated by the magnet and the coils around the cores crossing the pair of airgaps of a bearing in accordance with the invention in the absence of notches in the ferromagnetic plates.
Figure 10:
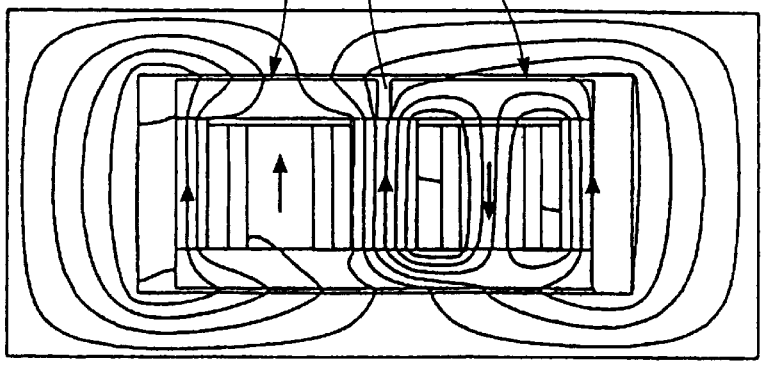
FIG. 10 is a diagram similar to that of FIG. 9 except that notches are formed in the ferromagnetic plates facing the magnets, as shown in FIG. 1.

As will emerge from the description of FIGS. 8 through 10, each core, carrying its coil, cooperates with the two magnets that it frames, with the notches facing these magnets, to contribute to centering about the radial axis passing through the core concerned.

There is therefore, in accordance with the invention, a circumferential offset between the core plus coil assembly and the permanently magnetized means which cooperate for the purpose of centering about one axis.

In that there is only one magnet between two successive cores, each of the magnets contributes to the centering effect of each of said cores by sharing its flux lines between the associated notches.

The bearing 10 of FIGS. 1 through 3 includes, on opposite sides of the rotation axis, two cores carrying a coil and cooperating with magnets. It is important to note that, in a particularly simple version, there could be only one core.

FIGS. 4 through 7 show variant embodiments of the bearing 10 of the invention.

FIGS. 4 and 5 show a magnetic bearing 30 which differs from the bearing 10 firstly by the relative position of the portions to which the relatively moving bodies are fixed and secondly by the shape of the cores and of the magnets.

It should be mentioned here that the components of the bearing 20 that have counterparts in the FIG. 10 bearing are designated by reference numbers which are deduced from the reference numbers of those counterpart components by adding 20.

Accordingly the bearing 20 includes, attached to a first body A', a first portion 31 including two ferromagnetic plates 33 and 34 between which are disposed cores 35 carrying coils 36 and permanent magnets 38.

The ferromagnetic plates 33 and 34 are separated from a second portion 32 attached to the body B' to be centered by airgaps 39 and 40.

However, unlike the bearing 10 from FIGS. 1 through 3, the component 32 of the bearing 20 from FIGS. 4 and 5 is radially outside the first portion 31.

Which configuration of the bearings 10 and 20 is chosen obviously depends on individual requirements.

FIG. 5 shows that the magnets 38 and the cores 35 have polygonal sections with sides that are either substantially parallel to the airgaps or substantially transverse thereto. To be more precise, the magnets and the cores are trapezoidal in shape, the adjacent sides of a core and of a neighboring magnet being substantially parallel. This leads to optimum occupancy of the space between the ferromagnetic plates 33 and 34.

FIGS. 6 and 7 show a third embodiment of the invention, namely a magnetic bearing 50 for centering relative to a fixed body A" a mobile body B" adapted to move in translation in a direction Y'—Y'.

The components of this bearing 50 that have counterparts in the bearing 10 from FIGS. 1 through 3 are designated by numbers that are deduced from the numbers of the latter counterpart components by adding 40.

Accordingly, referring to FIG. 6, the bearing 50 has a first portion 51 including two ferromagnetic plates 53 and 54 between which are disposed cores 55 carrying coils 56 and magnets 58. The bearing further includes a ferromagnetic portion 52 attached to the body B" to be centered and separated from the ferromagnetic plates 53 and 54 by airgaps 59 and 60.

Note that because the relative movement is a movement in translation along a linear line of relative movement (see the chain-dotted line 140 in FIG. 7), the ferromagnetic plates 53 and 54 are in fact duplicated on opposite sides of the portion 52 to which the body B" is fixed.

Each core 55 carrying a coil 56 defines with the two magnets 58 that it frames a centering axis. For a given centering axis there are preferably two cores carrying coils on opposite sides of the portion 52. In FIG. 7, the presence of two pairs of cores 55 defines two centering axes X1'—X1' and X2'—X2'. Given that the relative movement is a linear movement, these two centering axes are parallel.

Note that the magnets and the cores carrying coils of the bearing 10 and 50 are identical. The magnets and the cores can consequently be manufactured and stored without any knowledge of their final destination.

Alternatively, the magnets and the cores of the bearing 10 can of course be shaped like the cores and the magnets of the bearing 30. Likewise, the magnets and the cores of the bearing 50 can be polygonal in shape, in theory rectangular, so as to have sides that are either parallel or transverse to the airgaps 59 and 60.

FIGS. 8 through 10 show, in a manner approximating reality, the flux lines in the pair of airgaps separating the two portions of a magnetic bearing in accordance with the invention in various configurations.

To enable the representation in a plane of the path of the flux lines generated by the magnets and by the coils, a magnet 18' is shown disposed between two cores 15 and 15'" carrying coils, these cores being themselves framed by the magnet 18', by a half-magnet 18 on the left and by a half-magnet 18" on the right.

The cores and magnets are disposed between two horizontal bars representing the ferromagnetic plates 13 and 14. The airgaps crossed by the flux lines generated by the coils and the magnets are respectively disposed above and below the aforementioned horizontal bars. An external frame around these bars and running along these airgaps visualizes the flow of flux lines in the ferromagnetic part 12.

The diagrams of FIGS. 8 through 10, referring to two cores carrying a coil and framed by two half-magnets, visualizes the effect of centering about two neighboring centering axes.

FIG. 8 shows the flux lines generated by the magnets only, with no current applied to the coils carried by the cores. Note the perfect division of the flux lines on opposite sides of the central magnet 18'. The reader is reminded that the centering effect about each of the two centering axes depends on the number of flux lines crossing the top and bottom airgaps 19, 20.

The FIG. 9 diagram corresponds to the situation in which current is fed to the coil to generate flux lines that flow upwards in the lefthand core and downwards in the righthand core.

Note that the flux lines generated by the central magnet are mainly closed through the righthand core: there is therefore strong asymmetry between the flux lines closing on the right and the flux lines closing on the left. Note however that the flux in the top and bottom airgaps is substantially the same to the right and to the left of the central magnet 18'.

Consequently, although the coils of the two righthand and lefthand cores are energized differently, there is no decoupling between centering about the axis associated with the righthand core and centering associated with the lefthand core.

In FIGS. 8 and 9 the top and bottom bars between which the cores and magnets are gripped do not include any notches.

The top part of the FIG. 10 diagram shows a horizontal bar including a gap above the central magnet to represent a notch 21 of the bearing 10, however.

With the same mode of energization of the coils as in FIG. 9, the FIG. 10 diagram shows that the flux lines generated by the central magnet are likewise mainly deflected to the right. However, differing in this respect from what is shown in FIG. 9, the flux lines of the central magnet which are deflected to the right compared to the FIG. 8 diagram nevertheless cross the airgap to the left of the notch 21. Consequently, although the flux lines are mainly deflected to the right, more flux lines cross the top and bottom airgaps 19, 20 to the left of the central magnet than to the right. The result is an effect of shrinkage of the airgaps to the left of the central magnet, with a different effect for the top and bottom airgaps on the right. There is therefore no coupling between the centering axes corresponding to the righthand and lefthand parts of FIGS. 8 through 10. The presence of the notches 21 therefore guarantees good decoupling of the centering axes X—X and Y—Y of the bearing 10.

The same effect could obviously be obtained by disposing amagnetic bars rather than notches radially within the thickness of the ferromagnetic plates.

It goes without saying that the foregoing description has been given by way of non-limiting example only and that many variants may be proposed by the skilled person without departing from the scope of the invention.

There is claimed:

1. A magnetic bearing for active centering about at least one radially extending centering axis of a second body mobile relative to a first body about a rotation axis, comprising:

a first portion adapted to be fixed to one of said first and second bodies, said first portion including two parallel ferromagnetic plates extending perpendicular to said rotation axis, a first core carrying a first coil, and permanently magnetized means magnetized perpendicularly to said ferromagnetic plates, said first core carrying said first coil and said permanently magnetized means being mounted between said ferromagnetic plates, and a second portion adapted to be fixed to the other of said first and second bodies and separated from said ferromagnetic plates of said first portion by a pair of airgaps of variable thickness located between said first and second portions and each extending along a circular line centered on said rotation axis, wherein said permanently magnetized means are offset relative to said core in a direction substantially parallel to said circular line and said ferromagnetic plates are provided with notches aligned with said permanently magnetized means and oriented transversely to said circular line.

2. The magnetic bearing claimed in claim 1 wherein said permanently magnetized means include two permanent magnets on opposite sides of said core.

3. A magnetic bearing as claimed in claim 1 and further comprising at least one second core carrying a second coil and second permanently magnetized means offset parallel to said circular line relative to said second core, said second core being mounted between said ferromagnetic plates and offset relative to said first core parallel to said circular line and separated from said first core by a permanent magnet forming part of both said permanently magnetized means and said second permanently magnetized means.

4. A magnetic bearing as claimed in claim 1 including alternating permanent magnets and cores.

5. The magnetic bearing claimed in claim 1 wherein said permanently magnetized means are contiguous with said first core.

6. The magnetic bearing claimed in claim 1 wherein said permanently magnetized means and said first core have polygonal sections with a pair of sides which are substantially parallel to said circular line and a pair of sides substantially transverse relative to said circular line.

7. The magnetic bearing claimed in claim 1 wherein said pair of airgaps separating said first and second portions is annular.

8. The magnetic bearing claimed in claim 7 wherein said bearing includes four cores carrying four coils and four permanent magnets.

9. A magnetic bearing for active centering about a transverse centering axis of a second body mobile relative to a first body along a translation axis, comprising:

a first portion adapted to be fixed to one of said first and second bodies, said first portion including two parallel ferromagnetic plates extending parallel to said centering and translation axes, a first core carrying a first coil, and permanently magnetized means magnetized perpendicularly to said ferromagnetic plates, said first core carrying said first coil and said permanently magnetized means being mounted between said ferromagnetic plates, and a second portion adapted to be fixed to the other of said first and second bodies and separated from said ferromagnetic plates of said first portion by a pair of airgaps of variable thickness located between said first and second portions and each extending along a linear line parallel to said translation axis, wherein said permanently magnetized means are offset relative to said core in a direction substantially parallel to said linear line and said ferromagnetic plates are provided with notches aligned with said permanently magnetized means and oriented transversely to said translation axis.

10. The magnetic bearing claimed in claim 9 wherein said pair of airgaps separating said first and second portions is substantially rectilinear.

11. The magnetic bearing claimed in claim 9 wherein said pair of airgaps has a variable thickness parallel to said ferromagnetic plates.

12. The magnetic bearing claimed in claim 9 wherein said permanently magnetized means include two permanent magnets on opposite sides of said core.

13. A magnetic bearing as claimed in claim 9 and further comprising at least one second core carrying a second coil and second permanently magnetized means offset parallel to said linear line relative to said second core, said second core being mounted between said ferromagnetic plates and offset relative to said first core parallel to said linear line and separated from said first core by a permanent magnet forming part of both said permanently magnetized means and said second permanently magnetized means.

* * * * *